United States Patent [19]

Drossman

[11] Patent Number: 5,332,628
[45] Date of Patent: Jul. 26, 1994

[54] IRON BASED DUCTILE WIRE FOR FORMING A SURFACING ALLOY SYSTEM

[75] Inventor: Richard O. Drossman, Aliquippa, Pa.

[73] Assignee: Wear Management Services, Inc., Aliquippa, Pa.

[21] Appl. No.: 1,335

[22] Filed: Jan. 7, 1993

[51] Int. Cl.$^5$ ................................. B22F 7/04
[52] U.S. Cl. ................. 428/558; 219/146.23; 219/146.41
[58] Field of Search ............ 428/588, 548, 558, 562, 428/563; 219/146.23, 146.41; 420/50, 94, 97, 112, 117

[56] References Cited

U.S. PATENT DOCUMENTS

| | | | |
|---|---|---|---|
| 3,770,427 | 11/1973 | Petersen | 75/171 |
| 4,185,136 | 1/1980 | Wasserman et al. | 428/561 |
| 4,245,145 | 1/1981 | Maniar et al. | 219/146.1 |
| 4,394,560 | 6/1983 | Kishida et al. | 219/137 |
| 4,396,820 | 8/1983 | Puscher | 219/121 |
| 4,402,742 | 9/1983 | Pattanaik | 75/123 |
| 4,423,119 | 12/1983 | Brown et al. | 428/558 |
| 4,426,428 | 1/1984 | Kammer et al. | 428/561 |
| 4,430,122 | 1/1984 | Pauga | 75/123 |
| 4,800,131 | 1/1989 | Marshall et al. | 428/558 |
| 4,810,464 | 3/1989 | Szereto et al. | 420/97 |

*Primary Examiner*—Donald P. Walsh
*Assistant Examiner*—Anthony R. Chi
*Attorney, Agent, or Firm*—Pearne, Gordon, McCoy & Granger

[57] ABSTRACT

An iron base wear-resistant surfacing alloy characterized by the absence of cobalt. The alloy is in the form of a hollow ductile wire having a powdered metal core. The wire comprises a mild steel, and the composition of the wire and core, taken together, consists essentially of, by weight, from about 3% to about 5% boron; up to about 10% chromium; from about 27% to 43% nickel; from about 0.1% to about 5% silicon; from about 0.2% to about 1.5% carbon; from about 0.1% to about 2 % manganese; with iron comprising the balance and in amounts greater than 43%.

7 Claims, No Drawings

IRON BASED DUCTILE WIRE FOR FORMING A SURFACING ALLOY SYSTEM

BACKGROUND OF THE INVENTION

This invention relates to hard surfacing alloys and, more particularly, to iron base alloys which are cobalt-free and which utilize relatively high levels of nickel and low levels of chromium and boron. The alloys are suitable for use in arc or thermal welding or spraying to produce overlays to protect against wear in a variety of environments. More particularly, this invention relates to an iron base cobalt-free wear-resistant surfacing alloy system in the form of a mechanically alloyed wire. According to this invention, the wire is a metal core or flux core wire.

PRIOR ART

Hard facing is essentially a welding process which forms an alloy surface on a base metal to provide a wear, heat, and corrosion-resistant surface for the base metal. Hard facing is used where it is difficult to lubricate the base metal against abrasion or to provide a wear-resistant surface where it is impractical or impossible to harden the surface by conventional heat treating or heat hardening metallurgical techniques. Alloys employed as hard facing materials range from low cost ferrous material to relatively expensive nickel, cobalt or tungsten base alloys.

Generally, the hard facing alloys may be classified as low alloy ferrous materials, high alloy ferrous materials, nickel base alloys, cobalt base alloys, and tungsten carbide. The low alloy ferrous materials include chromium as the chief alloy and constituent in amounts ranging from 1% to 7%, with relatively small amounts of manganese, molybdenum, silicon, and carbon. The high alloy ferrous materials include chromium in amounts up to 15%, with significant amounts of molybdenum and/or manganese. The nickel base alloys include between 70% and 80% nickel, and between 10% and 17% chromium. The cobalt base alloys have between 45% and 65% cobalt, and between 20% and 30% chrome, and between 5% and 50% tungsten.

Iron base alloys having high levels of chromium (10% to 35%) and carbon (2% to 6%) by weight are well-known as hard surfacing materials. The lower levels of these elements (chromium at 10% to 15%, carbon at 2% to 3%) depend upon phase change and/or formation of acicular chromium carbides for their resistance to wear. The higher levels (chromium at 15% to 35%, carbon at 3% to 6%) also form hexagonal chromium carbides. The alloys offer good wear-resistance in areas of high abrasion with low or moderate temperature and/or corrosive media are involved and where numerous surface cracks are not detrimental to the performance of the surfaced part.

Many alloy substitutes have been designed to replace the cobalt base alloys of high chromium content with modest success. These iron and nickel base alloys have been successful as cobalt alloy substitutes in some applications, but have not significantly increased their resistance to galling in applications where self-lubrication is indicated.

In addition, since the sources for cobalt are quite limited, and this element is extensively used in the aerospace industry, cobalt is considered to be a strategic material. This condition, when coupled with the price pressure of cobalt, has led to efforts to develop alloys which retain the performance characteristics of the cobalt base alloys which are generally rated as the most versatile of the hard facing materials, while using little or none of this element. Traditionally, the cobalt-chromium-carbon tungsten and/or molybdenum alloys are the preferred solution for critical wear surfaces involving high temperatures and/or corrosion involving metal-to-metal surfaces.

An acceptable alloy system which meets many of the performance criteria of the cobalt base materials, including resistance to galling and cracking, is set forth in U.S. Pat. No. 4,810,464. According to that patent, this alloy system consists of nickel, chromium, boron, carbon, silicon, manganese and iron, wherein the elements are present in the following amounts by weight: nickel, from about 27% to about 43%; chromium, up to about 10%; boron, from about 3% to about 5%; carbon, from about 0.2% to about 1.5%; silicon, from about 0.15% to about 5%; manganese, from about 0.1% to about 2%; and iron, balance in amounts greater than 43%. The alloys, according to that patent, are prepared by conventional powder metallurgy techniques to produce powders capable of being consolidated into wire, rod, or ingot form. The application of these alloys by techniques such as powder spray, powder spray and fuse, powder welding and welding with cast rods all have limitations. Usually, these processes are limited to thin single layers of less than 1/16 inch and a relatively low production rate of from 1 to 5 lbs. of weld metal deposited per hour. Thus, for some major applications, a better consumable is needed to apply thicker deposits at higher deposition rates.

SUMMARY OF THE INVENTION

In accordance with this invention, an iron base cobalt-free system of alloy deposits utilizing high levels of nickel and low levels of chromium are utilized as a mechanically alloyed metal cored wire. The wire comprises a ductile metal sheath surrounding metallic or a combination of metallic and non-metallic powders completely enclosed by the sheath. The wire is readily used in electric arc and thermal welding or spraying at deposition rates of 5 to 25 lbs. or higher per hour.

In its deposited and alloyed form, the deposit has a composition of at least 60% iron by weight and the following listed components in the weight percentages specified: about 1.5% to 5% boron; up to 10% chromium; 24% to 43% nickel; 0.1% to 5% silicon; 0.2% to 1.5% carbon; and 0.1% to 2% manganese. The as deposited form of the alloy can be readily melted in a furnace and cast into shapes, atomized into a powder, or cast and crushed into a powder, but as was previously noted, the deposition rates of powders are relatively low. Casting the alloy into a solid wire is possible, but the wire is quite brittle, particularly in view of the high boron content of the alloy. Boron is present in an amount from about 3% to about 5% by weight. Boron lowers the liquidous temperature of the alloys at these levels as well as forming carbides and nitrides. It has been found that if nitrogen is present in amounts of from about 0.1% to 0.5%, the deposited alloy will exhibit excellent high temperature lubricity.

Due to the brittleness of a solid welding wire having the alloying constituents set forth above, according to this invention, a mild steel strip having up to 0.25% carbon and between about 0.15% and 0.50% manganese is provided and serves as a sheath for powdered alloying ingredients which, together with the steel strip, would combine to form the desired hard facing alloy.

DETAILED DESCRIPTION OF THE INVENTION

To form the wires, according to this invention, a strip of low carbon steel is formed into a U-shaped cross-section, and a metered amount of alloying powder is dispensed in the U-shaped cross-section. The U-shaped strip is passed through closing rolls which form a circular cross-section, and the tube is then pulled through drawing dies to reduce the diameter of the wire to a desired size and to compress the powder core. The resulting ductile wire has a composition within the desired parameters of this invention.

In order to more fully understand the subject matter of this invention, the following detailed examples are presented:

EXAMPLE 1

|  | % by Wt |
| --- | --- |
| Nickel | 13.0 |
| Nickel Boron (17%) | 20.0 |
| Manganese | 0.2 |
| Chromium | 1.0 |
| Ferro Silicon | 0.5 |
| Graphite | .3 |
| Total Fill | 35.0 |
| Steel Sheath % | 65.0 |

EXAMPLE 2

|  | % by Wt |
| --- | --- |
| Nickel Boron | 30.0 |
| 10% Chrome | 5.0 |
| Mn Si | 0.5 |
| Nickel | 4.5 |
| Chromium | 4.0 |
| Sub-Total | 44.0 |
| Steel Strip | 56.0 |
| TOTAL | 100.0 |

EXAMPLE 3

|  | % by Wt |
| --- | --- |
| Nickel/Boron | 22.5 |
| Ferro Silicon | 3.0 |
| Chromium | 7.0 |
| Nickel | 16.5 |
| Graphite | 1.0 |
| Sub-Total | 50.0 |
| Steel Strip | 50.0 |
| TOTAL | 100.0 |

EXAMPLE 4

|  | % by Wt |
| --- | --- |
| Ferro Boron 15/17%: | 20 |
| Manganese Metal | 0.3 |
| HC Ferro Chrome (5% C-67% Cr) | 1.7 |
| Ferro Silicon (50% Si) | 1.0 |
| Cast Iron (3.2% C) | 10.0 |
| Iron Powder | 7.0 |
| Sub-Total | 40.0 |
| Strip 50% Iron - 50% Nickel | 60.0 |
| TOTAL | 100.0 |

Although the preferred embodiments of this invention have been shown and described, it should be understood that various modifications and rearrangements of the parts may be resorted to without departing from the scope of the invention as disclosed and claimed herein.

What is claimed is:

1. An iron base wear-resistant surfacing alloy characterized by the absence of cobalt and being in the form of a hollow ductile wire having a powdered metal core, said ductile wire comprising a mild steel, the composition of said wire and said core, taken together, consisting essentially of, by weight, from about 3% to about 5% boron; up to about 10% chromium; from about 27% to about 43% nickel; from about 0.1% to about 5% silicon; from about 0.2% to about 1.5% carbon; from about 0.1% to about 2% manganese; from about 0.1% to about 0.5% nitrogen; with iron comprising the balance and in amounts greater than 43%, said alloy being further characterized by excellent high temperature lubricity.

2. An iron base alloy according to claim 1, including a fluxing agent and mixed in said powder in amounts up to 15% by weight.

3. An iron base alloy according to claim 2, wherein said fluxing agent is selected from the group consisting of flourspar, aluminum, titania, lime and mixtures thereof.

4. An iron base alloy according to claim 2, wherein at least some of said boron is present in the form of boron nitride.

5. An iron base alloy according to claim 1, wherein the mild steel comprises 65% by weight of the wire and the core, and the powder consists essentially of, by weight, 13% nickel; 20% nickel boron, with boron being present in an amount of 17%; 0.2% manganese; 1.0% chromium; 0.5% ferro silicon; and 0.3% graphite.

6. An iron base alloy according to claim 1, wherein said mild steel comprises 65% by weight of said ductile wire and powdered metal core, taken together, and said powdered metal core consists essentially of, by weight, 30% nickel boron; 5% carbon chrome (10% by weight carbon); 0.5% manganese silicon; 4.5% nickel; and 4.0% chrome.

7. An iron base alloy according to claim 1, wherein the mild steel comprises 50% by weight of said ductile wire and powdered metal core, taken together, and said powdered metal core consists essentially of, by weight, 13% nickel; 20% nickel boron, with boron being present in an amount of 17%; 0.2% manganese; 1.0% chromium; 0.5% ferro silicon; and 0.3% graphite, for the powder 22.5% nickel/boron; 3% ferro silicon; 7% chromium; 16.5% nickel; and 1% graphite.

* * * * *